(12) United States Patent
Zhai

(10) Patent No.: US 8,730,810 B2
(45) Date of Patent: May 20, 2014

(54) MEDIUM ACCESS CONTROL FORWARDING PROTOCOL

(75) Inventor: Hongqiang Zhai, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 253 days.

(21) Appl. No.: 13/055,162

(22) PCT Filed: Jul. 8, 2009

(86) PCT No.: PCT/IB2009/052973
§ 371 (c)(1),
(2), (4) Date: Jan. 21, 2011

(87) PCT Pub. No.: WO2010/013151
PCT Pub. Date: Feb. 4, 2010

(65) Prior Publication Data
US 2011/0128854 A1 Jun. 2, 2011

Related U.S. Application Data

(60) Provisional application No. 61/084,067, filed on Jul. 28, 2008.

(51) Int. Cl.
*H04L 12/26* (2006.01)

(52) U.S. Cl.
USPC .......................................... 370/235; 370/315

(58) Field of Classification Search
USPC .................. 370/227, 228, 235, 315
See application file for complete search history.

(56) References Cited

U.S. PATENT DOCUMENTS

| | | | |
|---|---|---|---|
| 2008/0084856 A1* | 4/2008 | Ramachandran | 370/342 |
| 2008/0159288 A1 | 7/2008 | Nagarajan et al. | |
| 2008/0205385 A1* | 8/2008 | Zeng et al. | 370/389 |
| 2009/0141668 A1* | 6/2009 | Zhang et al. | 370/315 |
| 2009/0147709 A1* | 6/2009 | Muqattash et al. | 370/310 |
| 2009/0175251 A1* | 7/2009 | Litzinger et al. | 370/338 |
| 2009/0252065 A1* | 10/2009 | Zhang et al. | 370/256 |

FOREIGN PATENT DOCUMENTS

WO WO2007131347 A1 11/2007
WO WO2008011717 A1 1/2008

OTHER PUBLICATIONS

Nuaymi L.: "WIMAX: Technology for Broadband Wireless Access" 2007, John Wiley & Sons, Ltd, Chichester, GB 73084, XP002559648, pp. 95-98.

* cited by examiner

*Primary Examiner* — Brian D Nguyen
(74) *Attorney, Agent, or Firm* — Larry Liberchuk

(57) ABSTRACT

A method (300) for improving quality of service of a wireless link between a source device and a destination device by forwarding frames on an alternate path between the source device and destination device. The method comprises selecting by the source device at least one forwarding device to be included on the alternate forwarding path; constructing a medium access control (MAC) forwarding frame (200) to include at least an address of the at least one forwarding device (S310); and transmitting the MAC forwarding frame to a forwarding device next to the source device (S320).

15 Claims, 7 Drawing Sheets

| MAC Header | MAC Frame Body format 220 | | | | | | | |
|---|---|---|---|---|---|---|---|---|
| | 221 | 222 | 223 | 224 | | 224 | 225 | 226 | 227 |
| 210 | Control | Rate (1 to N) (optional) | Source Address (optional) | DevAddr 1 | ... | DevAddr N | CRC (optional) | Frame payload | FCS |

| MAC Header 210 | | | |
|---|---|---|---|
| 211 | 212 | 213 | 214 |
| Source Address | Destination Address | Type | Duration |

MEDIUM ACCESS CONTROL FORWARDING PROTOCOL

This application claims the benefit of U.S. Provisional Application No. 61/084,067 filed on Jul. 28, 2008.

The invention generally relates to medium access control protocols in wireless networks.

In wireless networks, the quality of wireless links dynamically changes due to a number of reasons. The link quality may be significantly degraded when, for example, objects move around the link or objects block the line-of-sight of transmissions between a pair of devices. If the link quality degrades noticeably, the quality of service supported could be intolerable.

Even when the quality of a wireless link falls sharply, a pair of devices on the link may continue to communicate with each other at a very low data rate. This is due to the routing protocol currently being used to determine the transmission path between a source and destination device. For example, some routing protocols utilize a hop-count when determining the transmission path, thereby enforcing direct transmissions between neighbor devices to support the service between them regardless of the quality of the transmission path. Employing other metrics to select a transmission path between neighbors requires extensive processing time, thereby increasing the latency of transmissions. Additional latency is produced as typical routing protocols operate in the network layer and not in the MAC layer due to the additional processing time required for forwarding frames.

Therefore, it would be advantageous to provide a mechanism to continuously maintain the quality of service when the quality of a wireless link degrades noticeably.

Certain embodiments of the invention include a method for improving quality of service of a wireless link between a source device and a destination device by forwarding frames on an alternate path between the source device and destination device. The method comprises selecting by the source device at least one forwarding device to be included on the alternate forwarding path; constructing a medium access control (MAC) forwarding frame to include at least an address of the at least one forwarding device; and transmitting the MAC forwarding frame to the forwarding device next to the source device.

Certain embodiments of the invention also include a network device having at least a processor and a computer readable medium adapted to generate a medium access control (MAC) forwarding frame data structure. The MAC forwarding frame further comprises a header portion and a frame body, wherein the frame body includes at least: a control field for indicating at least a forwarding option, acknowledgment option, and a cyclic redundancy check (CRC) option for the frame; at least one device address (DevAddr) field for designating an address of an at least one device on a forwarding path; a frame payload field for carrying payload data to be delivered to a destination device; and a frame check sequence (FCS) field for detecting and correcting error bits in the payload data.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figures 1, 2A, 2B:
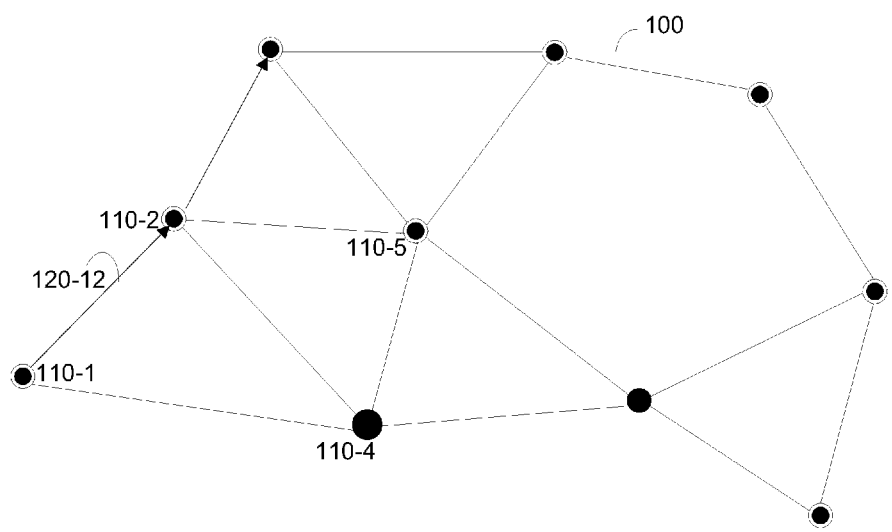
FIG. 1 is a schematic diagram of a wireless network.
FIGS. 2A and 2B illustrate the structure of a MAC forwarding frame constructed in accordance with an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention include a MAC protocol for improving the quality of service when the quality of wireless links degrades. The MAC protocol determines a forwarding path between two devices as an alternate path for a low-quality wireless link. For example, in the network 100 shown in FIG. 1, a wireless link 120-12 between a source device 110-1 and a destination device 110-2 encounters the degradation in quality. A forwarding path may be established between the devices 110-1 and 110-2 through forwarding devices 110-4 and 110-5. It should be noted that devices using the forwarding service are not necessarily neighbors of each other. The forwarding path could be dynamically changed by each forwarding device. The forwarding service is realized through a MAC forwarding frame and a MAC forwarding process described in detail below.

FIG. 2A shows an exemplary and non-limiting diagram of a MAC forwarding frame 200 constructed in accordance with an embodiment of the invention. The MAC forwarding frame 200 includes a header 210 and a body 220. The header 210, as illustrated in FIG. 2B, is a typical MAC header and includes at least the following fields: source address 211, destination address 212, type 213, and duration 214. The type field 213 designates the type of the frame, i.e., whether it is a forwarding frame or not. In accordance with certain embodiments of the invention the type of the MAC frame can be indicated using newly defined subtype fields in a MAC header, using a reserved bit of the frame control subfield (not shown) in a MAC header, or using a reserved bit of the sequence control subfield (not shown) in a MAC header.

The MAC frame body 220 consists of the following fields: Control 221, Rate 222, Source Address 223, N (where N is an integer number) Device Address (DevAddr) fields 224, cyclic redundancy check (CRC) 225, frame payload 226, and frame check sequence (FCS) 227. The Rate, Source Address, and CRC fields are optional.

The Control field 221 includes an Option field, a CRC Indicator field, and a Number of Devices field (these fields are not shown in the drawings). The Number of Devices field indicates the number of DevAddr fields 224 and is set to be the number of devices that remain on the forwarding path after the frame is received by a device indicated in the DevAddr field 224. The CRC Indicator defines whether or not the CRC field 225 is included in the frame 200. The Option field in the Control field 221 indicates two options for a forwarding device: forwarding and acknowledgement (ACK). The forwarding option indicates the forwarding action that should be taken by a device receiving the frame 200. Specifically, the forwarding action can be one of the following: immediately forwarding a received frame after an acknowledgement (ACK) frame and an inter-frame spacing, or forwarding a received frame 200 only when the device is allowed to access the medium. The ACK option indicates which devices should acknowledge a frame 200 and which devices should get acknowledgement of a transmission of a frame 200. Generally two types of ACK frames can be used: a block ACK acknowledging a number of received frames or an immediate ACK acknowledging each received frame.

The Rate field 222 designates the data rates to be used by each forwarding device designated in the DevAddr fields 224. The Rate field 222 is included in the frame 200 if the forwarding option is set to forward a frame only when a device is allowed to access the network and the number of DevAddr fields 224 is greater than zero. The Source Address field 223 specifies the source device address of a frame 200.

The number of N DevAddr fields 224 is determined by the value of Number of Devices field of the Control field 221. Each DevAddr field 224 carries the MAC address of the device. The device addresses are listed in the DevAddr fields 224 in the order they appear on the forwarding path in the direction from the source device to the destination device. That is, the address of the first device is the next device on the forwarding path and the address of the last device is of the destination device for the frame 200.

The CRC field 225 is utilized to detect and correct bit errors in the Control field 221, Rate field 222, Source Address field 223, and the DevAddr fields 224. The Frame Payload 226 is used to carry data to be delivered from the source device to the destination device. The FCS field 227 is used to detect and correct bit errors in the Frame Payload 226.

Figure 3:
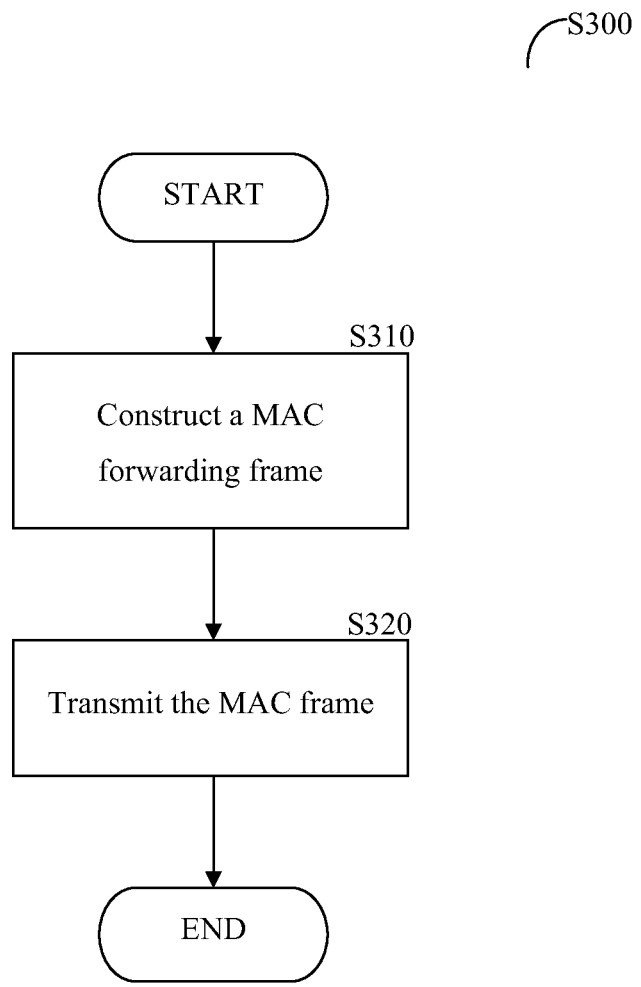
FIG. 3 is a flowchart illustrating a MAC forwarding process performed by a source device implemented in accordance with an embodiment of the invention.

FIG. 3 shows a non-limiting and exemplary diagram 300 describing the medium access control forwarding process performed by a source device in accordance with an embodiment of the invention. At S310 a source device constructs a MAC forwarding frame (e.g., frame 200) by using the forwarding devices' addresses on a selected forwarding path and setting the MAC frame type to a MAC forwarding frame type. Furthermore, the source device determines the forwarding path to the destination device and sets the forwarding and ACK options as well as whether to include the CRC field 225 in the frame. The process of constructing a MAC forwarding frame is described in greater detail with reference to FIG. 5.

Figure 4:
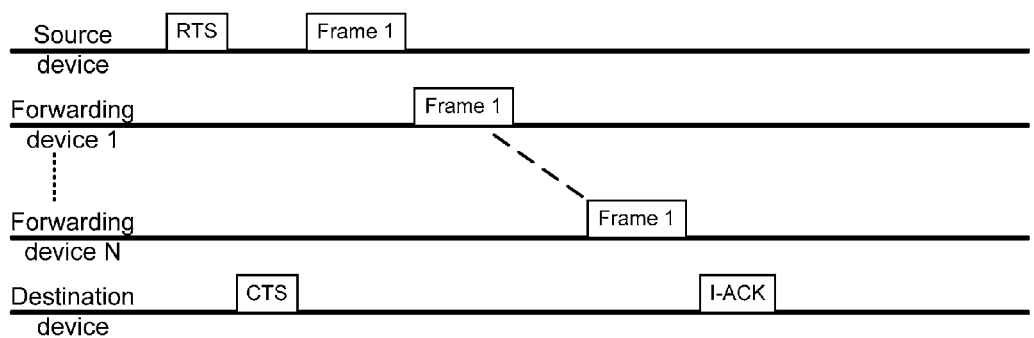
FIG. 4 is a diagram illustrating a process of forwarding frames while implementing a RTS/CTS mechanism.

At S320, the MAC forwarding frame is transmitted to the first device on the path after the source device. As illustrated in FIG. 4, in an embodiment of the invention, before transmitting the MAC forwarding frame, a source device may send a request to send (RTS) frame to its destination and expect a clear to send (CTS) frame to be sent back from the destination. In this embodiment, the destination should reply with a CTS frame and upon reception of this frame by the source device, the source device transmits the MAC forwarding frame. If the source device does not utilize the RTS/CTS option, the MAC forwarding frame is transmitted when the device is allowed to access the channel.

Figure 5:
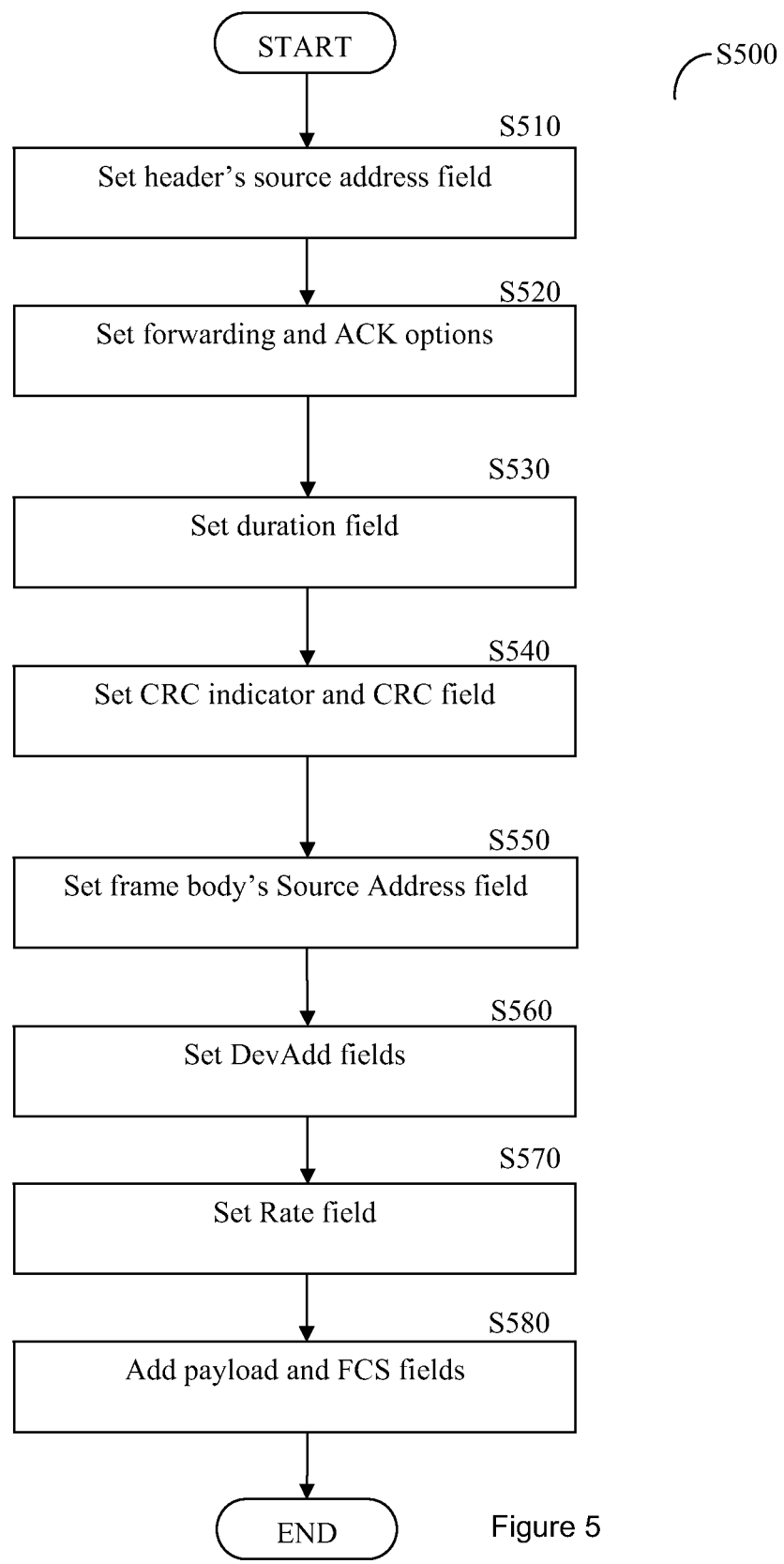
FIG. 5 is a flowchart illustrating a process of constructing a MAC forwarding frame implemented in accordance with an embodiment of the invention.

FIG. 5 shows a non-limiting and exemplary flowchart S500 describing the process for constructing a MAC forwarding frame implemented in accordance with one embodiment of the invention. The process may be performed by a source device or a forwarding device and will be described with reference to the structure of the MAC forwarding frame illustrated in FIGS. 2A and 2B.

At S510, a source address field 211 in the header 210 is set to be the address of the transmitting device. That is, the field 211 is set as the source device's address by the source device or as the forwarding device's address by a forwarding device. The destination address field 212 in the MAC header is always set as the receiving device's address. If the receiving device is a forwarding device, the field 212 is set to the forwarding device's address. If the receiving device is the destination device, the field 212 is set as the destination device's address.

At S520, the forwarding option and ACK options are determined and the Control field 221 is set accordingly. At S530, the duration field 214 in the header 210 is set according to the forwarding and ACK options being selected. Specifically, the duration field 214 is set to the duration of completing a frame transaction between the device indicated by the source address field 211 and the device indicated by the destination address field 212, if a device can forward an incoming frame only when the device is allowed to access the medium and further if the device is required to acknowledge the reception of each MAC forwarding frame. If the device immediately forwards a received frame and it is not required to individually acknowledge each received frame, the duration field 214 is set to the duration it takes to complete a frame transactions between devices consisting of the device indicated by the source address field 211 and a predefined number of first forwarding devices included in the DevAddr fields 224. The number of devices is determined to be from the first device on the forwarding path after the source device to the device which is either the destination or is not a neighbor of the source device. The duration of a transmission of the MAC forwarding frame at each forwarding device is determined by the corresponding transmission data rate indicated by the Rate field 222.

At S540 the CRC indicator in the Control field 221 and the value in the CRC field 225 are set. That is, if a CRC is being used when transmitting the frame the CRC indicator designates this fact, and the CRC field 225 is included in the frame; otherwise, the frame is transmitted without the CRC field 225. At S550, the Source Address field 223 in the frame body 220 is constructed. Specifically, the Source Address field 223 is included in frame 200 only if the forwarding option is set to forward a frame when a device is allowed to access the medium or when a frame is forwarded immediately after the reception of an acknowledgement frame and an inter-frame spacing, and as well as an acknowledgement is required by the ACK option. In one embodiment of the invention, the source address field 211 in the MAC header 210 may be used to designate the source address at all the forwarding devices, thus the Source Address 223 will be not included in the frame body 220.

At S560, the Number of Devices field in the Control field 221 and the DevAddr fields 224 are set. The Number of Devices field is always set as the number of the DevAddr fields 224 in the frame body 220. If the destination address field 213 of the MAC header 210 is not the address of the destination device, there are one or more devices including the destination device that remain on the forwarding path. Thus the DevAddr fields 224 of the frame body 200 include their addresses. The forwarding devices that have already been passed by the MAC forwarding frame and the address of the destination device are not included in the fields 224. Specifically, if the destination address field 212 of the MAC header 210 is the address of the destination device, neither the fields 224 nor Rate field 222 are included in the frame body 200. Optionally, at S570 the Rate field 222 is constructed to include the value of the transmission rate to be used for forwarding the frame. Finally, at S580 the Frame Payload and FCS fields are appended to the constructed frame.

Figure 6:
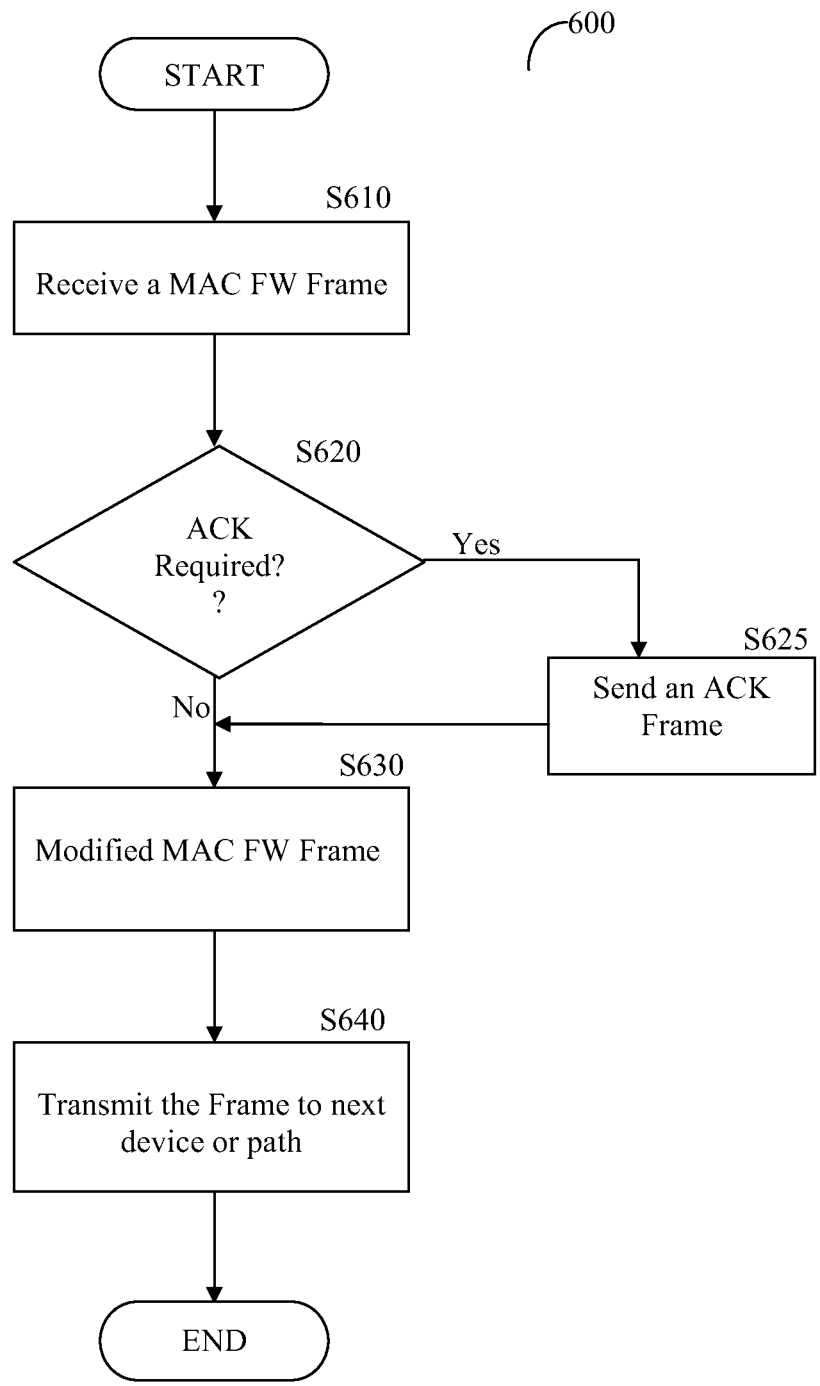
FIG. 6 is a flowchart illustrating a MAC forwarding process performed by a forwarding device implemented in accordance with an embodiment of the invention.

FIG. 6 shows a non-limiting and exemplary diagram 600 describing the medium access control (MAC) forwarding procedure performed by a forwarding device in accordance with an embodiment of the invention. At S610 a MAC forwarding frame is received at the device. Subsequently, the device performs a series of checks to determine if the frame is valid. For example, if the CRC field 225 and/or the FCS field 227 indicate an erroneous frame, the received frame is discarded.

At S620 it is checked if the received MAC forwarding frame requires an acknowledgment, and if so at S625 an ACK frame is sent; otherwise, the process continues with S630. The ACK frame is sent according to the forwarding and ACK options designated in the Control field 221. In one embodiment an ACK frame is sent to a device indicated by the destination address field 212 in the MAC header 210. In another embodiment when the ACK option is set to individually acknowledge the reception of the MAC forwarding frame and the forwarding option is set to immediately forward a received frame, the device only transmits an ACK frame if required when it is the intended destination or its next device on the forwarding path is not a neighbor of the source device as indicated by the Source Address field 223. The ACK frame is transmitted to the source device's address designated in the Source Address field 223.

At S630 the received MAC forwarding frame is modified. Specifically, the device removes the next forwarding device from the DevAddr fields 224. Then, the destination address 212 in the MAC header 210 is updated to specify the address designated in the removed DevAddr field 224. Thereafter, the rest of the fields in the frame 200 are modified as described in greater detail above. This includes, for example, modifying the Source Address 223 to include the address of the device. The device may also select a new forwarding path and accordingly update the DevAddr fields 224, as well as modify any option in the Control field 221.

At S640, the device transmits the modified MAC forwarding frame to a next device on the path as designated by the first DevAddr field 224 and according to the forwarding option being selected. Preferably, the device transmits the frame at a rate equal to or above the rate specified in the Rate field 222.

As mentioned above the forwarding device may select a new forwarding path if such a path exits. This allows transmitting a MAC frame that does not specify the entire path. This rule allows forwarding devices to make decisions of missing parts of the forwarding path, which shortens the frame and may as well result in a better path in some scenarios, especially when the forwarding path is long. If a better path is found between two forwarding devices or even to the destination device, a forwarding device uses the new path to forward the packet.

Figure 7A:
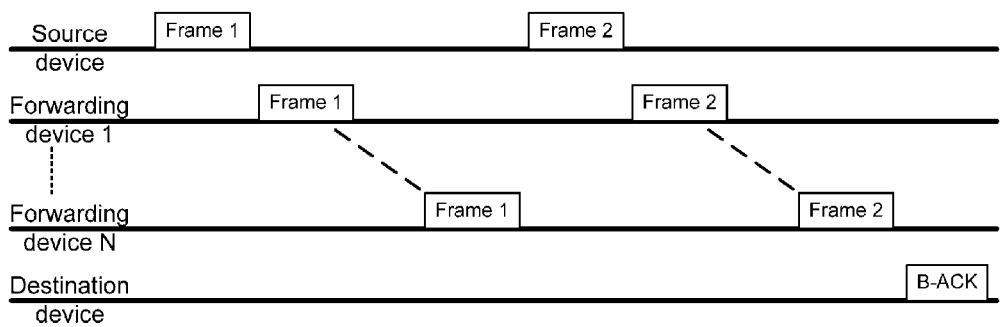
FIGS. 7A-7D are diagrams illustrating the various ACK options implemented in accordance with certain embodiments of the invention.
Figure 7B:
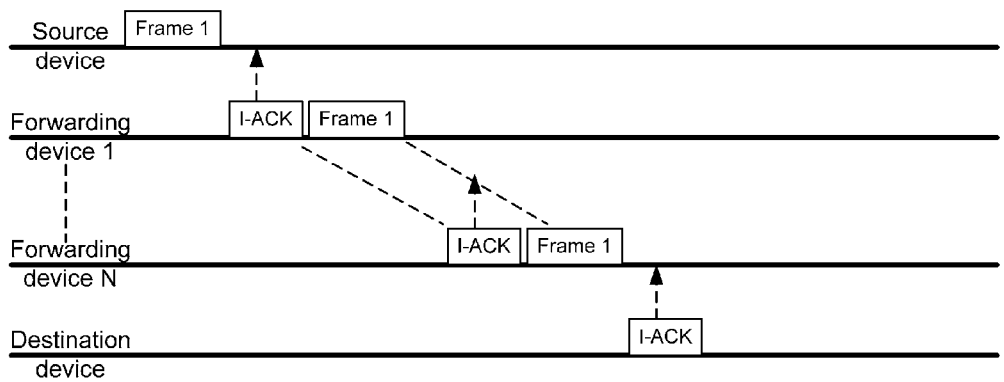
Figure 7C:
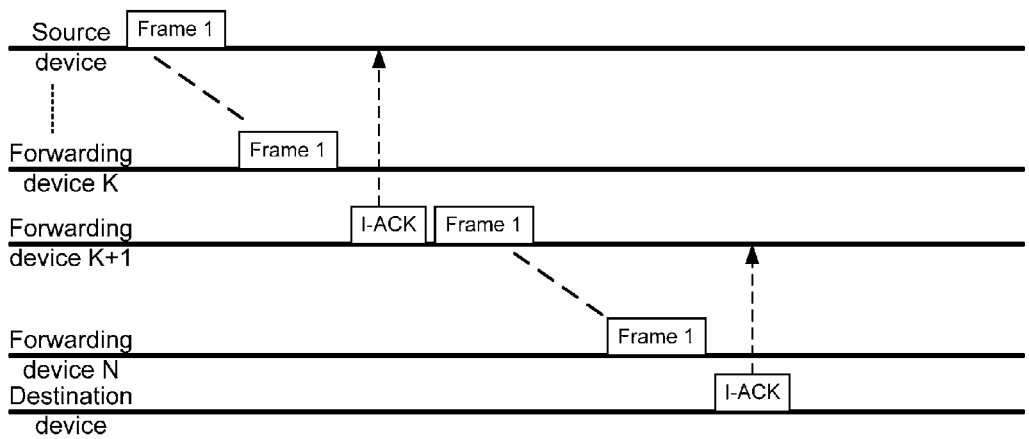
Figure 7D:
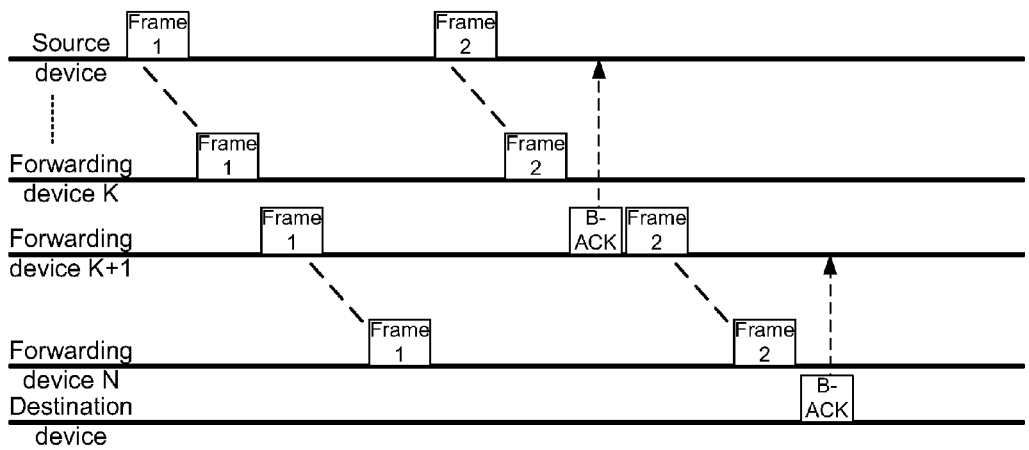

FIGS. 7A, 7B, 7C and 7D show non-limiting examples for ACK options that can be used by the disclosed MAC forwarding process. As illustrated in FIG. 7A a block acknowledgment (B-ACK) is transmitted by the destination device upon reception of the Frame-2, acknowledging both Frame-1 and Frame-2. FIG. 7B illustrates an ACK option where each forwarding device immediately acknowledges the reception of a frame by sending an immediate-ACK (I-ACK) to the transmitting device. FIGS. 7C and 7D show scenarios where the source and destination devices cannot communicate directly with each other. As a result, a forwarding device K+1 is used to send the ACK frame. In FIG. 7C, the forwarding device acknowledges the reception of a Frame-1 by sending an I-ACK frame to the source device, and the destination device acknowledges the reception of the Frame-1 by sending an I-ACK to the forwarding device K+1. In FIG. 7D, B-ACK frames are generated by the forwarding device K+1 and the destination device to acknowledge the reception of Frame-1 and Frame-2.

The MAC forwarding process and protocol disclosed herein can be implemented in communication systems including, but not limited to, UWB based WPANs, WiMedia based wireless networks and WPANs, or any time division multiple access (TDMA), super-frame based wireless or wireless networks with contention based medium access control protocol.

The principles of the invention may be implemented in hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. A method for improving a quality of service of a wireless link between a source device and a destination device by forwarding frames on an alternate path between the source device and the destination device, comprising:
   selecting, by the source device, one or more forwarding devices to be included on the alternate forwarding path, the one or more forwarding devices being exclusive of the destination device;
   constructing a medium access control (MAC) forwarding frame to include one or more respective addresses of the one or more forwarding devices and a payload data to be delivered to the destination device; and
   transmitting the MAC forwarding frame to a forwarding device next to the source device, the forwarding device being selected from the one or more forwarding devices.

2. The method of claim 1, further comprising forwarding, by each forwarding device, a received MAC forwarding frame to a next forwarding device on the alternate forwarding path until reaching the destination device.

3. The method of claim 2, wherein forwarding the received MAC forwarding frame further comprises selecting a new alternate forwarding path; and modifying the received MAC forwarding frame to at least designate the new alternate forwarding path.

4. The method of claim 1, wherein selecting the one or more forwarding devices further comprises determining at least a forwarding option and an acknowledgement (ACK) option for the MAC forwarding frame.

5. The method of claim 4, wherein the MAC forwarding frame includes at least a header portion and a frame body, wherein the frame body includes at least one of: a control field, at least one device address (DevAddr) field, a frame payload field, and a frame check sequence (FCS) field.

6. The method of claim 5, wherein the frame body further includes at least one of: a rate field, a source address field, and a cyclic redundancy check (CRC) field.

7. The method of claim 6, wherein constructing the MAC forwarding frame further comprises:
setting a source address field in the header to an address of a transmitting device, wherein the transmitting device is selected from the group consisting of the source device and the forwarding device;
setting a destination address field in the header to an address of a receiving device, wherein the receiving device is selected from the group consisting of the forwarding device and the destination device;
setting a duration field in the header to a duration required to complete a frame transaction;
setting the at least one DevAddr field to include an address of the one or more forwarding devices; and
appending the payload data in the payload field.

8. The method of claim 7, further comprising constructing the CRC field when a CRC indicator in the control field indicates that the CRC field should be included in the frame; and constructing the source address field when the forwarding option and the ACK option determine that the source address field should be included in the frame.

9. The method of claim 4, wherein the forwarding option defines a forwarding action that should be performed by a device receiving the MAC forwarding frame, wherein the forwarding action includes immediately forwarding the received MAC forwarding frame after an acknowledgement (ACK) frame and an inter-frame spacing, or forwarding the received MAC forwarding frame only when the receiving device is allowed to access the medium.

10. The method of claim 4, wherein the ACK option defines which device on the alternate path should acknowledge a received forwarding MAC frame and which device should receive an acknowledgement frame on transmission of a forwarding MAC frame.

11. The method of claim 10, wherein the acknowledgment frame is either a block acknowledgement (B-ACK) or an immediate acknowledgement (I-ACK).

12. The method of claim 1, wherein transmitting the forwarding MAC frame further comprises sending a request to send (RTS) frame to the destination device; and upon reception of a clear to send (CTS) frame sent back from the destination device, transmitting the MAC forwarding frame.

13. A network device having at least a processor and a computer readable medium adapted to generate a medium access control (MAC) forwarding frame data structure, wherein the data structure comprises:
a header portion;
a frame body, wherein the frame body includes:
a control field for indicating at least a forwarding option, an acknowledgment option, and a cyclic redundancy check (CRC) option for the MAC forwarding frame;
a plurality of device address (DevAddr) fields for designating an address of an at least one forwarding device on a forwarding path, the at least one forwarding device being exclusive of a destination device;
a frame payload field for carrying payload data to be delivered to the destination device; and
a frame check sequence (FCS) field for detecting and correcting error bits in the payload data.

14. The network device of claim 13, wherein the forwarding frame further includes at least one of:
a rate field for designating a rate to be used by the at least one forwarding device on the forwarding path;
a source address field for designating an address of a device sending the forwarding frame, and
a cyclic redundancy check (CRC) field for detecting and correcting error bits in the forwarding frame.

15. A computer readable medium having stored thereon computer executable code when executed causing a processor to perform the process of improving a quality of service of a wireless link between a source device and a destination device by forwarding frames on an alternate path between the source device and destination device, comprising:
selecting, by the source device, one or more forwarding devices to be included on the alternate forwarding path, the one or more forwarding devices being exclusive of the destination device;
constructing a medium access control (MAC) forwarding frame to include one or more respective addresses of the one or more forwarding devices and a payload data to be delivered to the destination device; and
transmitting the MAC forwarding frame to a forwarding device next to the source device, the forwarding device being selected from the one or more forwarding devices.

* * * * *